United States Patent
Ono

(10) Patent No.: US 9,030,172 B2
(45) Date of Patent: May 12, 2015

(54) VEHICLE AND METHOD OF CONTROLLING VEHICLE

(75) Inventor: Tomoya Ono, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 61 days.

(21) Appl. No.: 13/517,402

(22) PCT Filed: Nov. 18, 2010

(86) PCT No.: PCT/JP2010/070566
§ 371 (c)(1),
(2), (4) Date: Jun. 20, 2012

(87) PCT Pub. No.: WO2012/066665
PCT Pub. Date: May 24, 2012

(65) Prior Publication Data
US 2013/0293201 A1 Nov. 7, 2013

(51) Int. Cl.
*H02J 7/00* (2006.01)
*B60L 11/12* (2006.01)
(Continued)

(52) U.S. Cl.
CPC .............. *H02J 7/0055* (2013.01); *B60L 11/123* (2013.01); *B60L 11/14* (2013.01); *B60W 10/06* (2013.01); *B60W 10/08* (2013.01); *B60W 20/00* (2013.01); *B60W 30/18054* (2013.01); *B60W 2710/248* (2013.01); *Y02T 10/6269* (2013.01); *Y02T 10/6286* (2013.01); *Y02T 10/7077* (2013.01); *B60L 1/02* (2013.01); *B60L 3/0069* (2013.01); *B60L 3/04* (2013.01); *B60L 7/14* (2013.01); *B60L 11/005* (2013.01); *B60L 11/1816* (2013.01); *B60L 11/185* (2013.01); *B60L 11/1861* (2013.01); *B60L 11/1868* (2013.01); *B60L 2210/10* (2013.01); *B60L 2210/30* (2013.01); *B60L 2210/40* (2013.01); *B60L 2220/14* (2013.01); *B60L 2240/36* (2013.01);
(Continued)

(58) Field of Classification Search
USPC .......................... 320/104, 106–112, 127–136
See application file for complete search history.

(56) References Cited

U.S. PATENT DOCUMENTS 7,402,978 B2 * 7/2008 Pryor ............................ 320/104
7,884,577 B2 * 2/2011 Tsutsumi et al. ............. 320/150
(Continued)

FOREIGN PATENT DOCUMENTS

CN 101389518 A 3/2009
JP A-2-23039 1/1990
(Continued)

OTHER PUBLICATIONS

International Search Report issued in International Application No. PCT/JP2010/070566 on Dec. 21, 2010 (with translation).

*Primary Examiner* — Nghia Doan
(74) *Attorney, Agent, or Firm* — Oliff PLC

(57) ABSTRACT

A vehicle allows a power storage device mounted therein to be externally charged using electric power from an external power supply. The vehicle includes an engine, a motor generator and a vehicle ECU. The vehicle allows a motor generator to generate electric power by driving the engine. Then, when charging of the power storage device is not completed within a target charging time period set by the user only using the electric power from the external power supply in the case where external charging is performed, the vehicle ECU charges the power storage device with the electric power from the external power supply additionally using the electric power generated by driving the engine.

17 Claims, 8 Drawing Sheets

(51) Int. Cl.
  *B60L 11/14* (2006.01)
  *B60W 10/06* (2006.01)
  *B60W 10/08* (2006.01)
  *B60W 20/00* (2006.01)
  *B60W 30/18* (2012.01)
  *B60L 1/02* (2006.01)
  *B60L 3/00* (2006.01)
  *B60L 3/04* (2006.01)
  *B60L 7/14* (2006.01)
  *B60L 11/00* (2006.01)
  *B60L 11/18* (2006.01)

(52) U.S. Cl.
  CPC ...... *B60L 2240/421* (2013.01); *B60L 2240/441* (2013.01); *B60L 2240/80* (2013.01); *B60L 2250/10* (2013.01); *B60L 2250/14* (2013.01); *B60L 2250/16* (2013.01); *B60L 2260/44* (2013.01); *B60L 2260/58* (2013.01); *B60L 2270/12* (2013.01); *Y02T 10/7044* (2013.01); *Y02T 10/7005* (2013.01); *Y02T 10/7241* (2013.01); *Y02T 10/7022* (2013.01); *Y02T 10/7066* (2013.01); *Y02T 10/7216* (2013.01); *Y02T 10/6217* (2013.01); *Y02T 10/642* (2013.01); *Y02T 90/121* (2013.01); *Y02T 90/14* (2013.01); *Y02T 90/128* (2013.01); *Y02T 90/127* (2013.01)

(56) References Cited

U.S. PATENT DOCUMENTS

| | | |
|---|---|---|
| 8,368,347 B2 * | 2/2013 | Mitsutani ................ 320/104 |
| 2009/0015201 A1 | 1/2009 | Fukumura et al. |
| 2009/0024267 A1 | 1/2009 | Kawai |
| 2009/0039831 A1 * | 2/2009 | Ichikawa ................ 320/118 |
| 2009/0319110 A1 | 12/2009 | Tani et al. |

FOREIGN PATENT DOCUMENTS

| | | |
|---|---|---|
| JP | A-11-146505 | 5/1999 |
| JP | A-2004-88979 | 3/2004 |
| JP | A-2007-245999 | 9/2007 |
| JP | A-2008-195315 | 8/2008 |
| JP | A-2008-285116 | 11/2008 |
| JP | A-2009-240150 | 10/2009 |
| JP | A-2009-281254 | 12/2009 |
| JP | A-2010-884 | 1/2010 |
| JP | A-2010-4674 | 1/2010 |
| JP | A-2010-22099 | 1/2010 |
| JP | A-2010-173388 | 8/2010 |

* cited by examiner

VEHICLE AND METHOD OF CONTROLLING VEHICLE

TECHNICAL FIELD

The present invention relates to a vehicle and a method of controlling the vehicle, and particularly to charging control of a vehicle allowing charging of a vehicle-mounted power storage device using electric power from an external power supply.

BACKGROUND ART

In recent years, much attention has been given to a vehicle, as an environmentally-friendly vehicle, equipped with a power storage device (for example, a secondary battery, a capacitor and the like) and running with the driving force generated from the electric power stored in the power storage device. Such a vehicle includes, for example, an electric vehicle, a hybrid vehicle, a fuel cell vehicle, and the like. There is a proposed technique for charging the power storage device mounted in the above-described vehicle by a commercial power supply having high power generation efficiency.

As a hybrid vehicle, there is also a known vehicle equipped with a power storage device that can be charged by a power supply external to the vehicle (hereinafter simply referred to as an "external power supply") (which will be hereinafter simply referred to as "external charging") as in the case of the electric vehicle. For example, the so-called "plug-in hybrid vehicle" is known which is provided with a power storage device that can be charged by a household power supply through the charging cable connecting between the power receptacle provided in the house and the charging port provided in the vehicle. Accordingly, an improvement in the fuel consumption efficiency of the hybrid vehicle can be expected.

In such vehicles, it is desirable that, during external charging, the power storage device is fully charged as far as possible at the next scheduled running time.

Japanese Patent Laying-Open No. 11-146505 (PTL 1) discloses a configuration providing charging control for a battery for an electrically powered vehicle, in which the charge current value is increased within the range of the maximum allowable current value when the maximum controllable time period determined based on the current time and the next scheduled running time is shorter than the required charging time period determined based on the reference charge current value and the remaining capacity of the battery.

In Japanese Patent Laying-Open No, 11-146505 (PTL 1), the configuration described above allows the battery to be nearly fully charged as much as possible even in the case where the time period from the time at which an instruction is given to start charging to the scheduled running time is relatively short.

CITATION LIST

Patent Literature

PTL 1: Japanese Patent Laying-Open No. 11-146505
PTL 2: Japanese Patent Laying-Open No. 02-023039
PTL 3: Japanese Patent Laying-Open No. 2004-088979

SUMMARY OF INVENTION

Technical Problem

In the configuration of Japanese Patent Laying-Open No. 11-146505 (PTL 1), charging of the battery depends only on supply of the electric power transmitted from an external power supply through a charging cable. The above-described maximum allowable current value is limited by the capacity of the charging cable or the external power supply.

Accordingly, for example, when the time period from the time at which an instruction is given to start charging to the scheduled running time is relatively short and also when the current exceeding the maximum allowable current value is required, there may be a case where the battery cannot be fully charged at the next scheduled running time.

The present invention is directed to provide a vehicle allowing charging of a power storage device mounted therein using the electric power from an external power supply and the electric power generated by driving an internal combustion engine, to increase the possibility that the power storage device can be fully charged at the next scheduled running time.

Solution to Problem

A vehicle according to the present invention allows a power storage device mounted therein to be externally charged using electric power from an external power supply, and including a power generation device and a control device for controlling external charging. During external charging, the control device performs charging of the power storage device with the electric power from the external power supply additionally using electric power generated by the power generation device as required.

Preferably, the control device determines based on a target charging time period set by a user whether or not to perform charging additionally using the generated electric power.

Preferably, when it is estimated that charging is not completed within the set target charging time period only by the electric power from the external power supply, the control device uses the power generation device to generate electric power to provide charging electric power insufficiently provided by the external power supply, so as to fully supply required charging electric power.

Preferably, when it is estimated that charging is not completed within the set target charging time period only by the electric power from the external power supply, the control device makes a selection, based on setting by the user, between charging additionally using the generated electric power and extension of a charging time period.

Preferably, the power generation device can be set such that the generated electric power is variable. The control device controls the power generation device such that the unfilled electric power is generated within the set target charging time period.

Preferably, the control device stops power generation by the power generation device in a case where unfilled charging electric power of the required charging electric power can be supplied within the set target charging time period using only the electric power from the external power supply when charging is performed additionally using the generated electric power.

Preferably, the power generation device includes an internal combustion engine and a rotating electric machine generating electric power using driving force from the internal combustion engine.

Preferably, the vehicle further includes a warm-up device for raising a temperature of a catalyst for purifying exhaust gas of the internal combustion engine. When charging is performed additionally using the generated electric power, the control device raises the temperature of the catalyst by driving the warm-up device before driving the internal combustion engine.

Preferably, the control device drives the internal combustion engine when the temperature of the catalyst exceeds a predetermined reference temperature.

Preferably, the control device stops the warm-up device when the temperature of the catalyst exceeds a predetermined reference temperature.

Preferably, the power generation device includes a fuel cell.

Preferably, the vehicle further includes a notification unit for notifying the user of information about charging.

Preferably, when it is estimated that charging is not completed within the set target charging time period only by the electric power from the external power supply, the control device causes the notification unit to notify the user to make a selection between charging additionally using the generated electric power and extension of a charging time period.

Preferably, when it is estimated that charging is not completed within the set target charging time period even when charging is performed additionally using the generated electric power, the control device causes the notification unit to notify the user of at least one of the estimation that charging is not completed within the target charging time period and an estimated charging time period required until completion of charging.

A method of controlling a vehicle according to the present invention allows charging of a power storage device mounted in the vehicle using electric power from an external power supply and electric power generated by a power generation device mounted in the vehicle. The method includes the steps of: causing a user to set a target charging time period; determining whether charging of the power storage device is completed or not within the target charging time period using only the electric power from the external power supply; and, when charging of the power storage device cannot be completed within the target charging time period using only the electric power from the external power supply, charging the power storage device with the electric power from the external power supply additionally using the generated electric power.

Preferably, the power generation device includes an internal combustion engine and a rotating electric machine generating electric power using driving force from the internal combustion engine. The vehicle includes a warm-up device for raising a temperature of a catalyst for purifying exhaust gas of the internal combustion engine. The method further includes the step of raising the temperature of the catalyst by driving the warm-up device before driving the internal combustion engine when charging is performed additionally using the generated electric power.

Preferably, the vehicle further includes a notification unit for notifying the user of information about charging. The method further includes the step of causing the notification unit to notify the user to make a selection between charging additionally using the generated electric power and extension of a charging time period, when it is estimated that charging is not completed within the set target charging time period only by the electric power from the external power supply.

Preferably, the method further includes the step of causing the notification unit to notify the user of at least one of the estimation that charging is not completed within the target charging time period and an estimated charging time period required until completion of charging, when it is estimated that charging is not completed within the set target charging time period even if charging is performed additionally using the generated electric power.

Advantageous Effects of Invention

In the present invention, in a vehicle allowing charging of a power storage device mounted therein using electric power from an external power supply and electric power generated by driving an internal combustion engine, it is possible to increase the possibility that the power storage device can be fully charged at the next scheduled running time.

DESCRIPTION OF EMBODIMENTS

Figure 1:
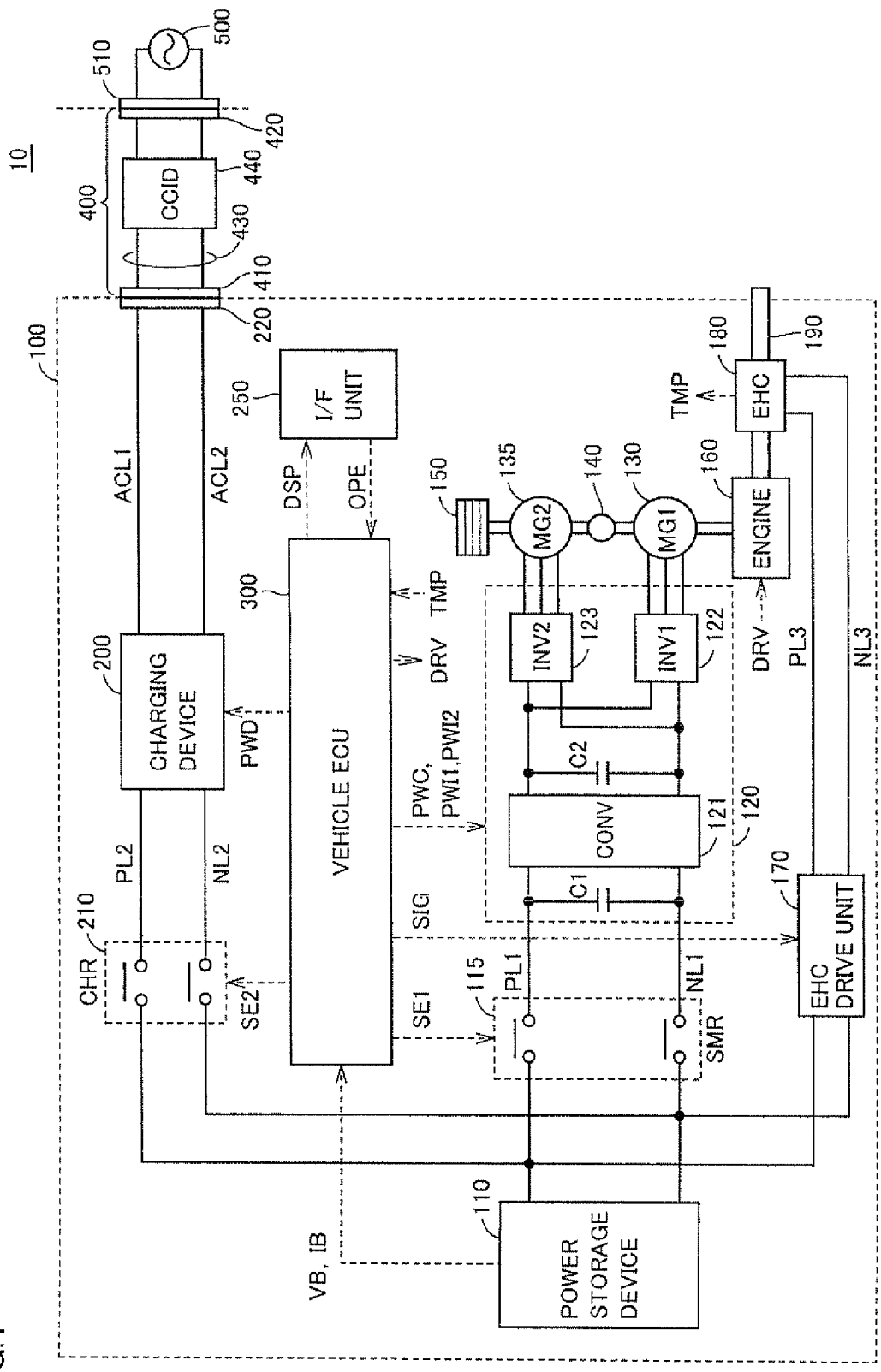
FIG. 1 is an entire block diagram showing a charging system including a vehicle according to the first embodiment.

The embodiments of the present invention will be hereinafter described in detail with reference to the accompanying drawings, in which the same or corresponding components are designated by the same reference characters, and description thereof will not be repeated.

First Embodiment

FIG. 1 is an entire block diagram showing a charging system 10 including a vehicle 100 according to the first embodiment.

Referring to FIG. 1, vehicle 100 includes a power storage device 110, a system main relay (SMR) 115, a PCU (Power Control Unit) 120 serving as a drive device, motor generators 130, 135, a power transmission gear 140, a driving wheel 150, an engine 160 serving as an internal combustion engine, an exhaust pipe 190 emitting exhaust gas from engine 160, an EHC (Electrical Heated Catalyst) 180 installed in exhaust pipe 190, an EHC drive unit 170, an interface (which will be also hereinafter referred to as an "I/F") unit 250, and a vehicle ECU (Electronic Control Unit) 300 serving as a control device. PCU 120 also includes a converter 121, inverters 122, 123, and capacitors C1, C2.

Power storage device 110 is a chargeable and dischargeable electric power storage element. Power storage device 110 is configured to include, for example, a secondary battery such as a lithium-ion battery, a nickel-metal hydride battery or a lead acid battery, or a power storage element such as an electric double layer capacitor.

Power storage device 110 is connected to PCU 120 through a power line PL1 and a ground line NL1. Power storage device 110 supplies the electric power for generating the driving force for vehicle 100 to PCU 120. Furthermore, power storage device 110 stores the electric power generated by motor generators 130 and 135. The output power of power storage device 110 is, for example, approximately 200V.

The relay included in SMR 115 is connected between power line PL1 and ground line NL1 each connecting power storage device 110 and PCU 120. Based on a control signal SE1 from vehicle ECU 300, SMR 115 switches between supply and interruption of the electric power between power storage device 110 and PCU 120.

Based on a control signal PWC from vehicle ECU 300, converter 121 performs voltage conversion between power line PL1 and ground line NL1, and a power line PL2 and ground line NL1.

Inverters 122 and 123 are connected in parallel to power line PL2 and ground line NL1. Based on control signals PWI1 and PWI2 from vehicle ECU 300, inverters 122 and 123 convert a direct-current (DC) power supplied from converter 121 into an alternating-current (AC) power, to drive motor generators 130 and 135, respectively.

Capacitor C1 is provided between power line PL1 and ground line NL1, and reduces the voltage variation between power line PL1 and ground line NL1 Capacitor C2 is also provided between power line PL2 and ground line NL1, and reduces the voltage variation between power line PL2 and ground line NL1.

Motor generators 130 and 135 each are an AC rotating electric machine, and, for example, a permanent magnet type synchronous electric motor provided with a rotor into which a permanent magnet is incorporated.

The output torque of each of motor generators 130 and 135 is transmitted to driving wheel 150 through power transmission gear 140 formed to include a reduction gear and a power split device, for driving vehicle 100. Motor generators 130 and 135 can generate electric power by the rotating force of driving wheel 150 during the regenerative braking operation of vehicle 100. PCU 120 then converts the generated electric power into charging electric power for power storage device 110.

Furthermore, motor generators 130 and 135 are coupled also to engine 160 through power transmission gear 140. Then, motor generators 130, 135 and engine 160 are cooperatively operated by vehicle ECU 300, to generate required vehicle driving force. Furthermore, motor generators 130 and 135 can generate electric power by rotation of engine 160, and also can charge power storage device 110 using this generated electric power. In the first embodiment, motor generator 135 is used as an electric motor exclusively for driving the driving wheel 150 while motor generator 130 is used as a power generator exclusively driven by engine 160. In other words, in the first embodiment, motor generator 130 and engine 160 each correspond to a "power generation device" in the present invention.

In addition, although FIG. 1 shows an example of the configuration in which two motor generators are provided, the number of motor generators to be provided is not limited thereto as long as a motor generator capable of generating electric power by engine 160 is provided. The number of motor generators to be provided may be one, or two or more.

Engine 160 is controlled by a control signal DRV from vehicle ECU 300 to adjust the rotation speed, the opening and closing timings of the valve, the fuel flow rate, and the like.

Exhaust pipe 190 is coupled to an exhaust port of engine 160 and emits the exhaust gas produced in engine 160 to the outside of the vehicle.

EHC 180 is installed in the intermediate portion of exhaust pipe 190. EHC 180, which includes the so-called three-way catalyst unit, removes harmful substances such as nitrogen oxide contained in the exhaust gas. Furthermore, EHC 180 uses the electric power supplied from EHC drive unit 170 controlled by a control signal SIG from vehicle ECU 300, to thereby raise the temperature of the three-way catalyst included therein. Generally, the three-way catalyst cannot sufficiently function as a catalyst unless it is raised to a temperature equal to or higher than the activation temperature. ECH 180 uses the electric power supplied from EHC drive unit 170 to raise the temperature of the three-way catalyst, thereby allowing the three-way catalyst to function as a catalyst in an early stage.

Furthermore, EHC 180 further includes a temperature sensor (not shown) and serves to detect a catalyst temperature TMP and output the detection result to vehicle ECU 300. Based on this catalyst temperature TMP, vehicle ECU 300 controls supply of the electric power to EHC 180 by EHC drive unit 170.

EHC drive unit 170 is connected to power storage device 110 and also connected to EHC 180 through a power line PL3 and a ground line NL3. EHC drive unit 170 uses the electric power from power storage device 110 to generate electric power for driving EHC 180, and switches supply and interruption of the electric power to EHC 180. Examples of EHC 180 may include a DC/DC converter, an inverter, a relay or the like.

I/F unit 250 provides an interface between the user and vehicle ECU 300. Although not shown, I/F unit 250 includes an input unit for providing an input of an instruction from the user and a display unit for displaying the state and the warning about each unit of the device to the user. I/F unit 250 transmits an operation signal OPE input through the input unit from the user to vehicle ECU 300. Furthermore, based on a display signal DSP from vehicle ECU 300, I/F unit 250 displays the display contents for the user on the display unit.

Although not shown in FIG. 1, vehicle ECU 300 includes a CPU (Central Processing Unit), a storage device and an input/output buffer. This vehicle ECU 300 inputs the signal from each sensor and the like and outputs the control signal to each device while controlling vehicle 100 and each device. It is to be noted that the above-described control is not limited to the process by software, but can be carried out by dedicated hardware (an electronic circuit).

Vehicle ECU 300 calculates a state of charge SOC of power storage device 110 based on detection values of a voltage VB and a current IB from a voltage sensor and a current sensor (that are not shown) provided in power storage device 110.

Vehicle ECU 300 generates and outputs a control signal for controlling PCU 120, SMR 115, and the like. In addition, although FIG. 1 shows a configuration in which one control device is provided as vehicle ECU 300, a control device may be provided for each of functions or for each of devices to be controlled, for example, as with a control device for PCU 120 and a control device for power storage device 110.

Vehicle 100 includes a connection unit 220, a charging device 200 and a charging relay CHR 210 as a configuration for charging power storage device 110 with the electric power from an external power supply 500.

A charging connector 410 of a charging cable 400 is connected to connection unit 220. The electric power from external power supply 500 is transmitted to vehicle 100 through charging cable 400.

In addition to charging connector 410, charging cable 400 includes a plug 420 for connecting to a receptacle 510 of external power supply 500 and a power line unit 430 connecting charging connector 410 and plug 420. A charging circuit interrupt device (hereinafter also referred to as a "CCID") 440 for switching between supply and interruption of the electric power from external power supply 500 may be disposed in power line unit 430.

Charging device 200 is connected to connection unit 220 through power lines ACL1 and ACL2. Charging device 200 is also connected to power storage device 110 by power line PL2 and ground line NL2 through CHR 210.

Charging device 200 is controlled by a control signal PWD from vehicle ECU 300 to convert the AC power supplied from connection unit 220 into charging electric power for power storage device 110.

CHR 210 is controlled by a control signal SE2 from vehicle ECU 300 to switch between supply and interruption of the charging electric power from charging device 200 to power storage device 110.

In addition, although an explanation has been given in FIG. 1 with regard to the case where charging cable 400 is connected to receptacle 510 and thereby directly connected to external power supply 500, there is also the case where a power feeding device may be provided between charging cable 400 and external power supply 500.

Figure 2:
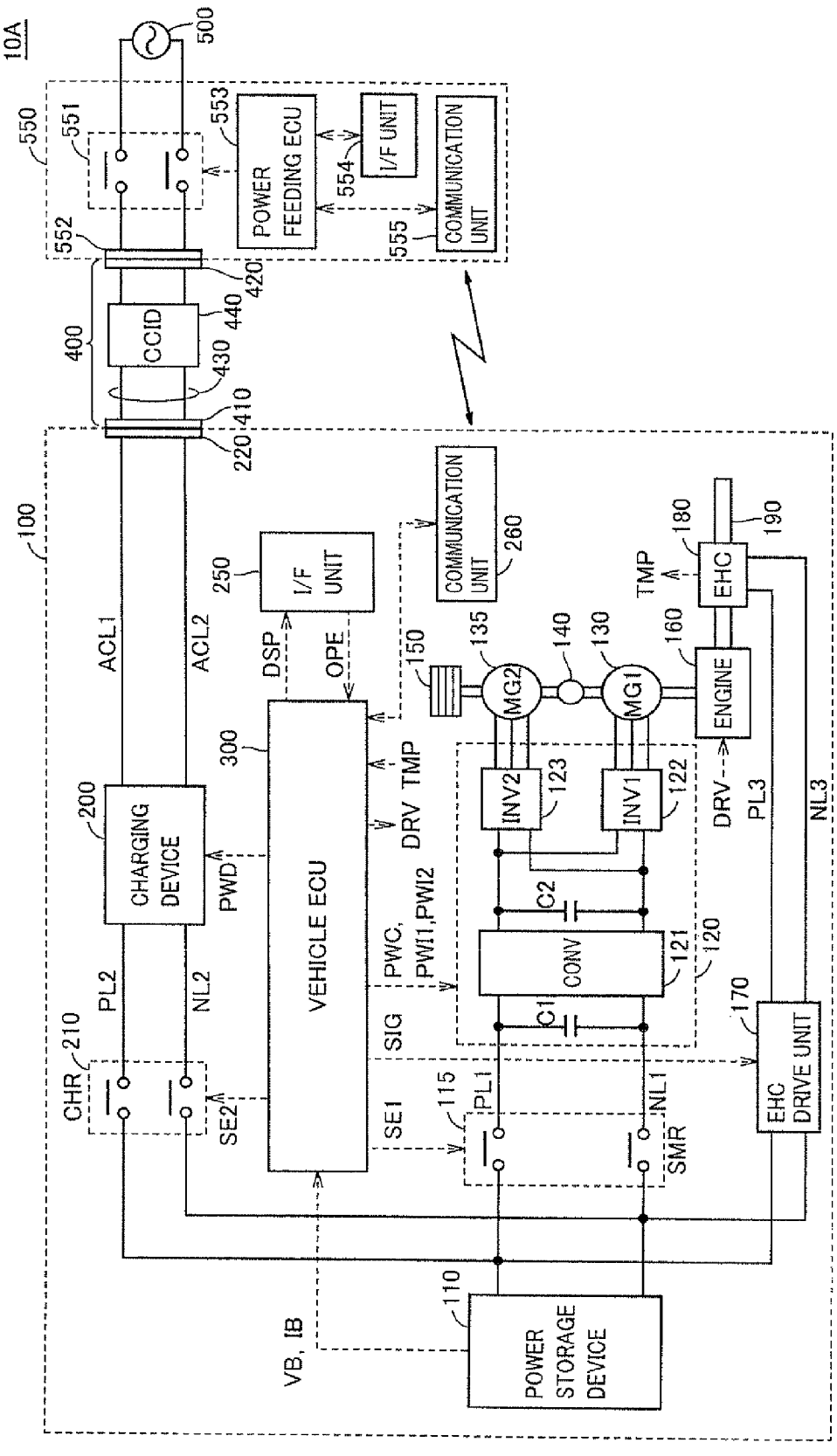
FIG. 2 is an entire block diagram showing another example of the charging system including a vehicle according to the first embodiment.

FIG. 2 shows an entire block diagram of an example of a charging system 10A in the case where a power feeding device 550 is provided between charging cable 400 and external power supply 500.

Referring to FIG. 2, a vehicle 100A further includes a communication unit 260 for communicating with power feeding device 550, in addition to the configuration of vehicle 100 in FIG. 1.

Power feeding device 550 includes a relay 551, a connection unit 552, a power feeding ECU 553, an I/F unit 554, and a communication unit 555.

In the example in FIG. 2, charging cable 400 is connected to connection unit 552 of power feeding device 550. Connection unit 552 is connected to external power supply 500 through relay 551.

Relay 551 is controlled by power feeding ECU 553 to switch between supply and interruption of the electric power from external power supply 500 to charging cable 400.

Communication unit 555 can transmit and receive a signal to and from communication unit 260 of vehicle 100A. In addition, the communication between communication unit 555 and communication unit 260 may be wireless communication or may be wired communication through a control line included in charging cable 400.

I/F unit 554 receives an operation signal from the user and displays a warning and the like to the user. Each setting about external charging from the user can also be made in each of I/F unit 250 included in vehicle 100A and I/F unit 554 included in power feeding device 550.

In the above-described vehicle, the user may set the next scheduled running time or the charging completion target time when external charging is performed. Vehicle ECU controls the charge starting time, the charging electric power supplied from the charging device and the like such that the power storage device is fully charged at the set target time.

However, depending on the setting by the user, there may be a case where the charging time period from the current time to completion of charging may be set to be relatively short. This may lead to the case where the power storage device cannot be fully charged by the set time due to restriction on the allowable current capacity that can be transmitted through the charging cable, the allowable power capacity that can be supplied from the external power supply, and the like.

Particularly in recent years, for the purpose of protection of environment, emission of $CO_2$ and exhaust gas from vehicles may be limited depending on the area. When the hybrid vehicle as described above runs in such an area, it is necessary to perform the so-called EV (Electric Vehicle) running in which the vehicle runs only using the electric power from a power storage device.

However, since a hybrid vehicle can also run using an engine, the power storage device mounted therein may be configured to have not so large capacity. In this case, when the vehicle runs in the area requiring the above-described EV running, it becomes necessary to fully charge the power storage device immediately before the vehicle goes into the area. This increases the need to fully charge the power storage device in a short period of time, thereby increasing the possibility that the power storage device cannot be fully charged using the electric power from the external power supply within the target charging time period set by the user as described above.

Thus, according to the first embodiment, a hybrid vehicle allowing charging with the electric power from the external power supply and also allowing generation of electric power by driving the engine mounted therein is provided. In this hybrid vehicle, when the power storage device needs to be fully charged in a short period of time, charging control is performed for charging the power storage device in a short period of time with the electric power from the external power supply additionally using the electric power generated by driving the engine. By the configuration as described above, the charging electric power insufficiently provided only by the electric power from the external power supply can be compensated by the electric power generated by driving the engine. Accordingly, it becomes possible to increase the possibility that the power storage device can be fully charged even in the case where the target charging time period is relatively short.

Figure 3:
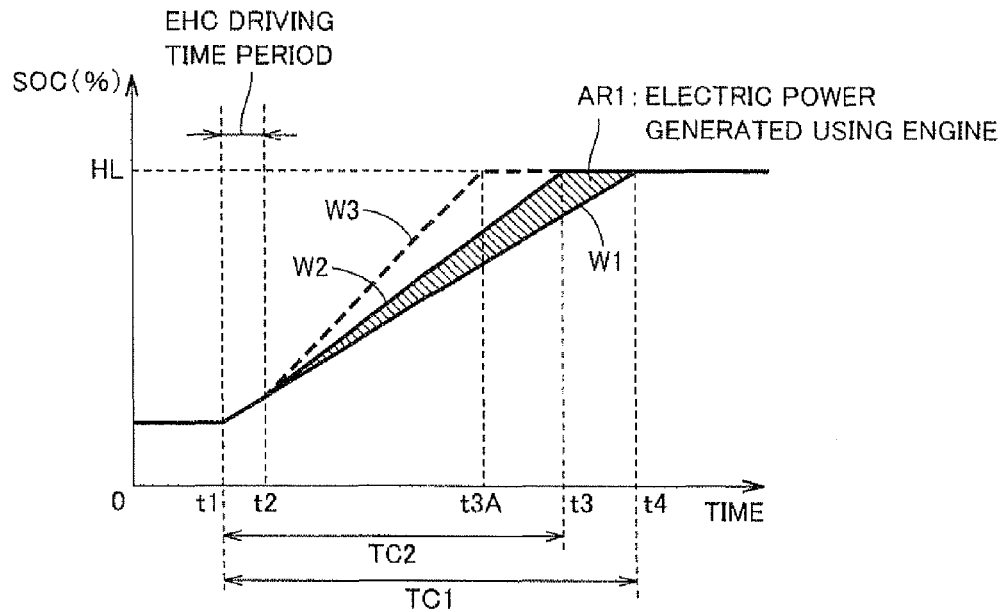
FIG. 3 is the first diagram for illustrating an outline of charging control in the first embodiment.
Figure 4:
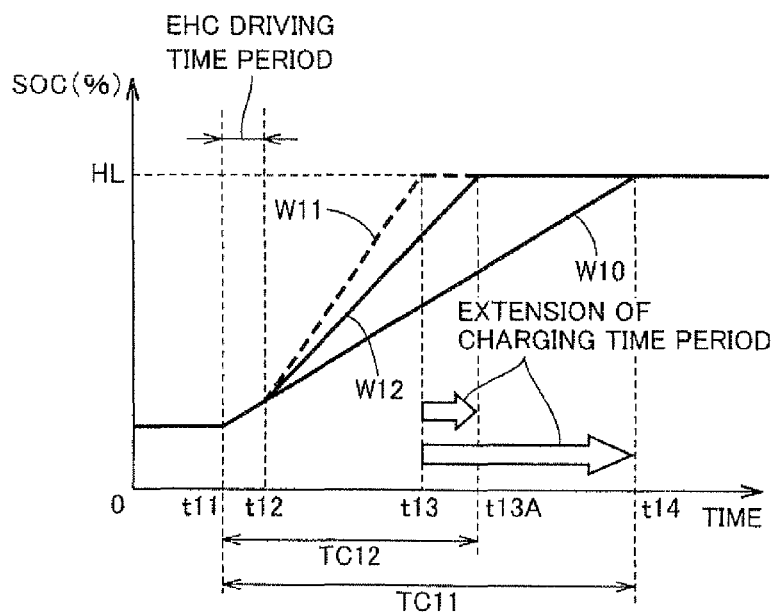
FIG. 4 is the second diagram for illustrating the outline of charging control in the first embodiment.
Figure 5:
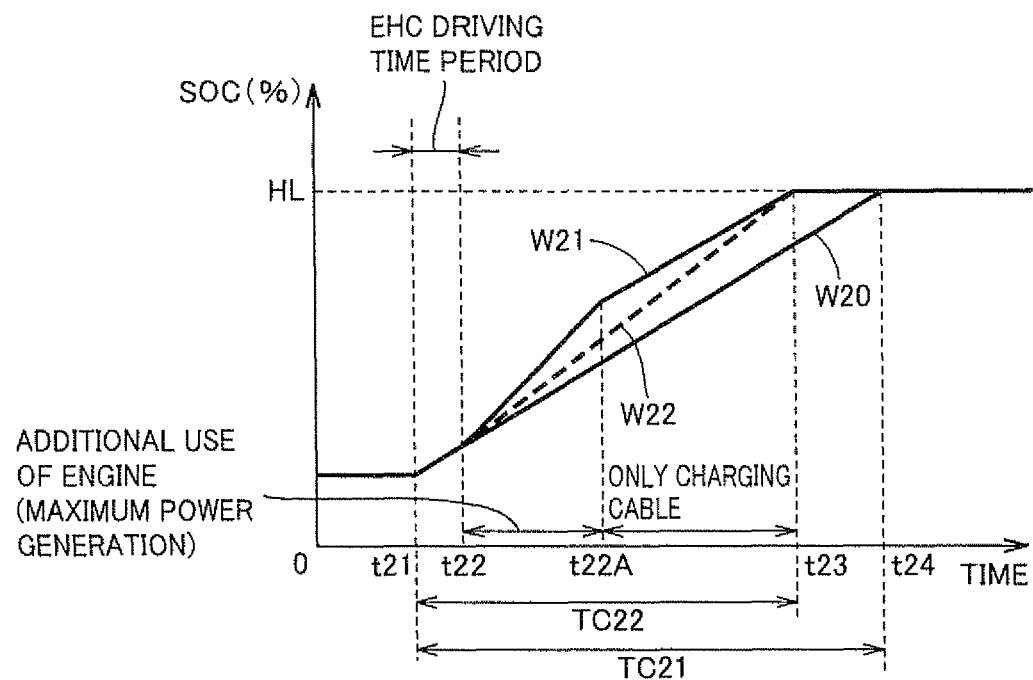
FIG. 5 is the third diagram for illustrating the outline of charging control in the first embodiment.

FIG. 3 is a diagram for illustrating the outline of charging control in the first embodiment. In FIG. 3 and FIGS. 4 and 5 described later, the horizontal axis shows a time while the vertical axis shows an SOC of the power storage device.

Referring to FIG. 3, a line W1 shows a change in the SOC at the time when charging is performed in the shortest time period using only the electric power from the external power supply in the case where external charging is started at time t1. A charging time period in this case is TC1. When the charging completion target time set by the user is later than time t4, the power storage device can be fully charged using only the electric power from the external power supply at the charging completion target time.

However, in the case where the charging completion target time set by the user is, for example, time t3 and the case where a charging time period TC2 from the start of charging to completion of charging is shorter than the above-described TC1 (TC1>TC2), the power storage device cannot be fully charged at the charging completion target time only by the electric power from the external power supply.

Accordingly, in the first embodiment, the electric power that is insufficiently provided only by the electric power from the external power supply (a region AR1 in FIG. 3) is compensated by the electric power generated using the engine, such that the power storage device is fully charged at time t3 corresponding to the charging completion target time set by the user.

In this case, the exhaust gas is emitted by driving the engine. When the temperature of the catalyst for purifying the exhaust gas is equal to or lower than the activation temperature, the exhaust gas cannot be fully purified. Accordingly, in the first embodiment, the EHC is used to raise the temperature of the catalyst before driving the engine. Then, when the temperature of the catalyst reaches the activation temperature (time t2 in FIG. 3), the engine is started. Also in this way, the exhaust gas can be properly purified even when the engine is driven during external charging.

In addition, the electric power generation using the engine generally depends on setting of the PCU and the rotation speed of the motor generator (that is, engine rotation speed). In principle, it is desirable to drive the PCU and the engine so as to achieve the highest power generation efficiency at the engine rotation speed at which the highest fuel efficiency can be achieved. However, when the required electric power to be generated is greater than the electric power that can be generated on the above-described optimal conditions, it is also possible to increase the electric power to be generated at the expense of efficiency to some extent. For example, when the charging completion target time set by the user (for example, time t3A in FIG. 3) results in a relatively shorter charging time period, the electric power to be generated using the engine is increased as shown by a dashed curved line W3 in FIG. 3. In this way, the driving state of the engine is adjusted in accordance with an unfilled amount of the charging electric power, so that a desired amount of electric power can be generated.

On the other hand, due to a decrease in the power generation efficiency as described above, when the engine is used to generate too much electric power, the fuel efficiency may be deteriorated to the contrary. Furthermore, the engine is driven at a high rotation speed, which may cause a problem of noise to the surroundings. Furthermore, although the exhaust gas is purified by the catalyst, the engine is driven in the state where the vehicle is stopped, which may also cause a problem that a certain amount of exhaust gas fills the surrounding area.

Accordingly, it is preferable that the amount of the electric power to be generated by the engine (or the engine rotation speed) is limited to a prescribed level. As shown in FIG. 4, the charging time period at charging completion target time t13 set by the user is further shorter (time t13) than the charging time period at the charging completion time (time t13A in FIG. 4) in the case where the greatest amount of electric power generated by the engine is used, it is necessary to extend the charging time period to time t13A or time t14 in the case where only the electric power from the external power supply is used. In the first embodiment, in such a case, the user is notified that charging is not completed in the set charging time period, then allowing the user to select whether to stop power generation using the engine or to extend the charging time period.

In addition, although FIGS. 3 and 4 each show a graph as an example in which the generated electric power is kept almost constant during the time period while electric power is generated using the engine, the manner of driving the engine is not limited thereto.

For example, as shown in FIG. 5, the engine is driven (times t22 to t22A in FIG. 5) such that the electric power generated using the engine becomes greatest within an allowable range in the time period during which the engine is additionally used (or on the condition that the highest power generation efficiency is achieved). Then, when it becomes possible to compensate for the insufficient amount of charging electric power only by the electric power from the external power supply, the engine may be stopped in the middle of the time period of external charging, and subsequently, charging may be performed only using the electric power from the external power supply. This allows reduction in the time period during which the engine is being driven, so that it is advantageous that it becomes possible to prevent emission of exhaust gas and production of noise for a long period of time.

Furthermore, in the first embodiment, even in the case where charging is not completed within the set charging time period only by the electric power from the external power supply, it is not necessarily need to additionally use the engine for power generation. For example, in the case where fuel consumption by the engine is not desirable, the user can also extend the charging time period so that charging can be performed using the electric power from the external power supply. Accordingly, in the first embodiment, when it is set as a mode in advance whether or not to perform charging additionally using the engine, or when it is determined that charging is not completed within the set charging time period only by the electric power from the external power supply, the user is urged to make a selection through the I/F unit.

Figure 6:
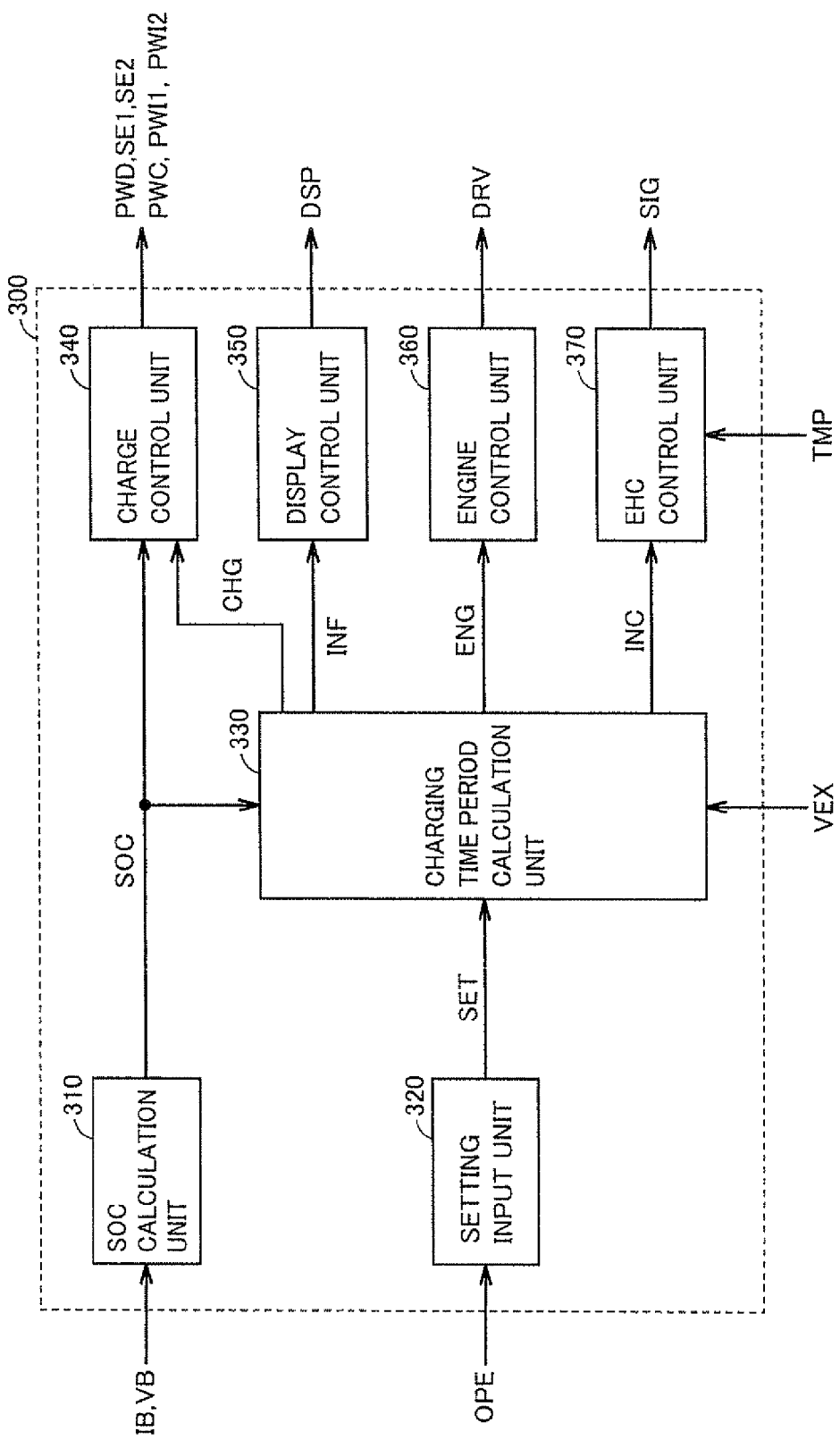
FIG. 6 is a functional block diagram for illustrating charging control performed in a vehicle ECU in the first embodiment.

FIG. 6 is a functional block, diagram for illustrating charging control performed in vehicle ECU 300 in the first embodiment. Each functional block described in the block diagram illustrated in FIG. 6 is implemented by hardware or software processing by vehicle ECU 300.

Referring to FIGS. 1 and 6, vehicle ECU 300 includes an SOC calculation unit 310, a setting input unit 320, a charging time period calculation unit 330, a charge control unit 340, a display control unit 350, an engine control unit 360, and an EHC control unit 370.

SOC calculation unit 310 receives detection values of a voltage VB and a current IB of power storage device 110 that are detected by the sensor included in power storage device 110. SOC calculation unit 310 calculates the SOC of power storage device 110 based on these pieces of information, and outputs the calculation result to charging time period calculation unit 330 and charge control unit 340.

Setting input unit 320 receives an operation signal OPE by the user that is set through the I/F unit. Operation signal OPE includes the next scheduled running time or the charging completion target time, the information as to whether engine 160 is additionally used or not, and the like. Setting input unit 320 outputs setting information SET included in the received operation signal OPE to charging time period calculation unit 330.

Charging time period calculation unit 330 receives the SOC from SOC calculation unit 310, setting information SET from setting input unit 320, and a power supply voltage VEX supplied from external power supply 500. As for power supply voltage VEX supplied from external power supply 500, for example, the voltage detected by the voltage sensor (not shown) connected between power lines ACL1 and ACL2 may be used, or the predetermined reference voltage value may be used. In addition, in the case where charging cable 400 includes a CCID 440, this CCID 440 may be temporarily closed for the purpose of detecting power supply voltage VEX prior to the actual charging operation in which charging device 200 is driven.

Based on these pieces of information, charging time period calculation unit 330 calculates the charging time period that is required when only the electric power from external power supply 500 is used. Then, charging time period calculation unit 330 compares the calculated required charging time period with the target charging time period that is determined based on the setting by the user, to determine whether charging can be completed or not within the target charging time period only by the electric power from external power supply 500.

When it is determined that charging cannot be completed only by the electric power from external power supply 500, thereby requiring additional use of the electric power generated using engine 160, charging time period calculation unit 330 causes display control unit 350 to notify the user about this determination.

When it is required by the charging mode set in advance or the input from the user to additionally use engine 160, charging time period calculation unit 330 outputs a charging signal CHG to charge control unit 340 and outputs an engine drive signal ENG to engine control unit 360. This engine drive signal ENG may include, for example, engine rotation speed, engine driving time period and the like during power generation. Furthermore, when engine 160 is additionally used, charging time period calculation unit 330 outputs a temperature increase signal INC to EHC control unit 370 in order to raise the temperature of the catalyst.

When it is not necessary to additionally use engine 160, or when engine 160 is not additionally used based on the setting by the user, charging time period calculation unit 330 does not output a drive signal to engine control unit 360 and EHC control unit 370, but outputs charging signal CHG to charge control unit 340.

Charge control unit 340 receives the SOC calculated in SOC calculation unit 310 and charging signal CHG from charging time period calculation unit 330. Based on these pieces of information, charge control unit 340 generates control signals PWD and SE2 to control charging device 200 and CHR 210. Consequently, power storage device 110 is charged using the electric power from external power supply 500.

Furthermore, when engine 160 is additionally used for power generation, charge control unit 340 generates control signals PWC, PWI1 and PWI2 of converter 121, inverters 122 and 123 included in PCU 120, and control signal SE1 of SMR 115. Charge control unit 340 thereby controls converter 121, inverters 122, 123, and SMR 115, to charge power storage device 110 using the electric power generated by motor generator 130.

Display control unit 350 receives display information INF from charging time period calculation unit 330. Then, based on this display information INF, display control unit 350 outputs control signal DSP to I/F unit 250 (and I/F unit 554 of power feeding device 550 in FIG. 2) to display the notification information to the user.

Engine control unit 360 receives engine drive signal ENG from charging time period calculation unit 330. Based on this information, engine control unit 360 outputs control signal DRV to engine 160 to control the fuel flow rate, the opening/closing timings of the valve included in engine 160, and the like.

EHC control unit 370 receives temperature increase signal INC from charging time period calculation unit 330 and a catalyst temperature TMP from the temperature sensor included in EHC 180. When engine 160 is additionally used for power generation and also when catalyst temperature TMP is lower than the activation temperature, before driving engine 160, EHC control unit 370 controls EHC drive unit 170 by control signal SIG to cause EHC 180 to raise the temperature of the catalyst.

Figure 7:
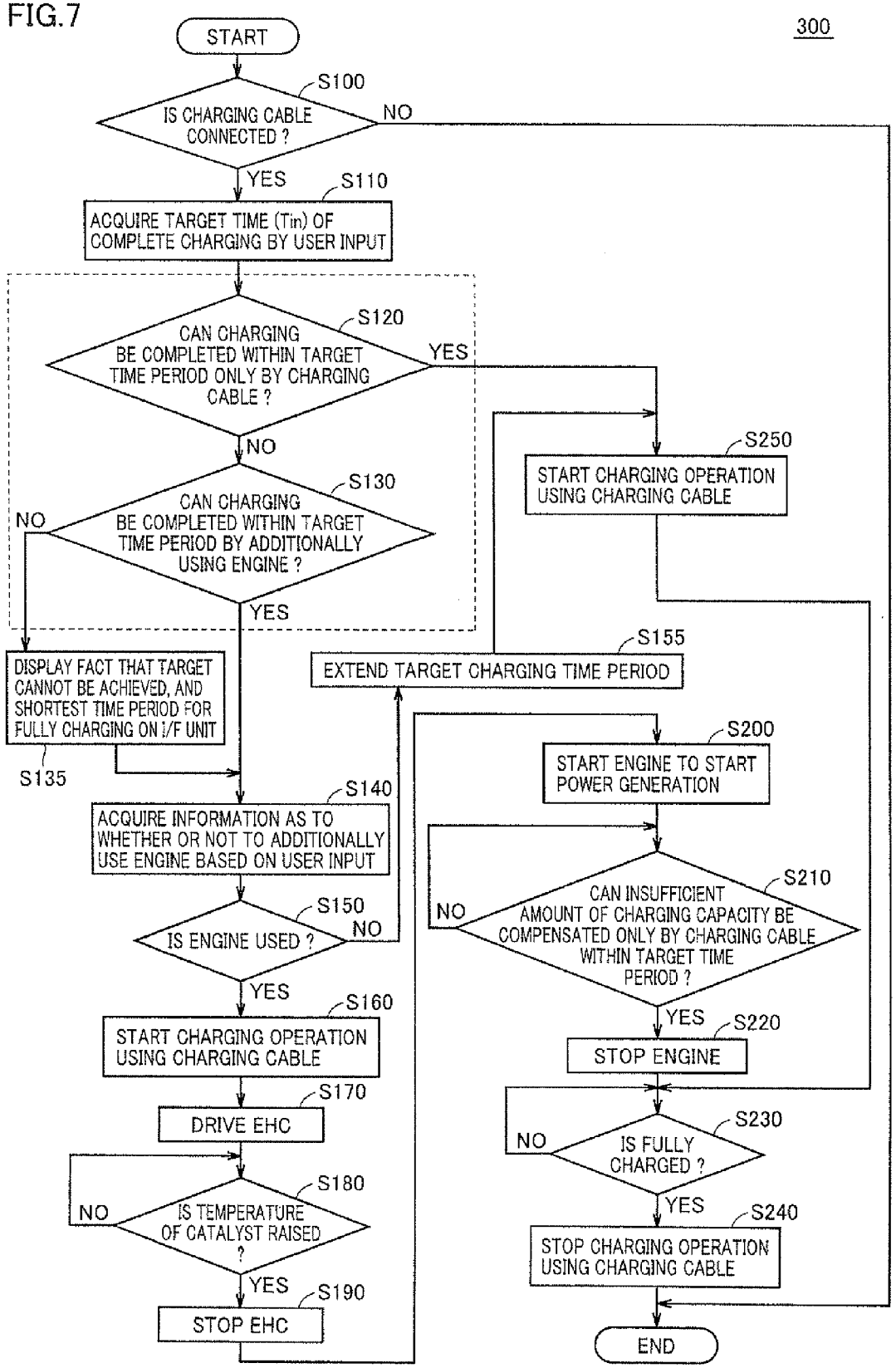
FIG. 7 is a flowchart for illustrating a charging control process performed in the vehicle ECU in the first embodiment.

FIG. 7 is a flowchart for illustrating the charging control process performed in vehicle ECU 300 in the first embodiment. Each step in the flowcharts shown in FIG. 7 and FIG. 8 described later is implemented by executing the program stored in advance in vehicle ECU 300 in predetermined cycles. Alternatively, in some of the steps, the process can also be implemented by constructing dedicated hardware (an electronic circuit).

Referring to FIGS. 1 and 7, in step (which will be hereinafter abbreviated as S) 100, vehicle ECU 300 determines whether or not connection to external power supply 500 via charging cable 400 is established.

When connection to external power supply 500 is not established (NO in S100), external charging is not performed. Thus, vehicle ECU 300 ends the process.

When connection to external power supply 500 is established (YES in S100), the process proceeds to S110 in which vehicle ECU 300 acquires charging completion target time Tin that is set by the user through I/F unit 250. Then, in S120, vehicle ECU 300 determines whether or not charging of power storage device 110 is completed only by the electric power from external power supply 500 using charging cable 400 within the target charging time period that is determined based on charging completion target time Tin acquired in S110.

When it is determined that charging of power storage device 110 is completed within the target charging time period (YES in S120), it is not necessary to generate electric power using engine 160. Accordingly, the process proceeds to S250 in which vehicle ECU 300 starts the charging operation using charging cable 400. Then, in S230, vehicle ECU 300 determines whether or not power storage device 110 is fully charged.

When power storage device 110 is not fully charged (NO in S230), the process is returned to S230 in which it is waited until power storage device 110 is fully charged while keeping the charging operation.

When power storage device 110 is fully charged (YES in S230), the process proceeds to S240 in which vehicle ECU 300 stops the charging operation using charging cable 400. Then, the process is ended.

On the other hand, when it is determined as NO in S120, that is, it is determined that charging of power storage device 110 is not completed within the target charging time period, vehicle ECU 300 determines in S130 whether or not charging of power storage device 110 can be completed within the target charging time period by additionally using engine 160 for power generation.

When it is determined that charging of power storage device 110 can be completed within the target charging tune period by additionally using engine 160 (YES in S130), the process proceeds to S140.

When it is determined that charging of power storage device 110 cannot be completed within the target charging time period by additionally using engine 160 (NO in S130), the process proceeds to S135, in which vehicle ECU 300 displays, on I/F unit 250, the determination result that charging cannot be completed within the target time period and the shortest charging time period during which power storage device 110 can be fully charged by additionally using engine 160 for power generation. Then, the process proceeds to S140.

In S140, based on the input by the user, vehicle ECU 300 acquires the information as to whether engine 160 is additionally used for power generation. This input by the user includes an input to I/F unit 250 by the user and an input of the mode that is set in advance by the user. Furthermore, when charging of power storage device 110 cannot be completed within the target charging time period even by additionally using engine 160, vehicle ECU 300 acquires not only the information about additional use of engine 160 as described above but also the information about the target charging time period that is re-set by the user.

Then, vehicle ECU 300 determines in S150 whether or not to additionally use engine 160 for power generation.

When engine 160 is not additionally used for power generation (NO in S150), in S155, vehicle ECU 300 extends the target charging time period to the charging time period during which charging can be completed using only the electric power from external power supply 500, and then, performs the charging operation using charging cable 400 (S250).

When engine 160 is additionally used for power generation (YES in S150), vehicle ECU 300 first starts the charging operation using charging cable 400 in S160. Then, in S170, vehicle ECU 300 causes EHC 180 to start to raise the temperature of the catalyst, and in S180, determines whether catalyst temperature TMP is raised to the activation temperature.

When catalyst temperature TMP is not raised to the activation temperature (NO in S180), the process is returned to S180 in which vehicle ECU 300 waits until catalyst temperature TMP reaches the activation temperature.

When catalyst temperature TMP is raised to the activation temperature (YES in S180), vehicle ECU 300 stops EHC 180 to raise the temperature of the catalyst in S190. Then, in S200, vehicle ECU 300 starts engine 160 and controls PCU 200 to charge power storage device 110 by using the electric power generated by motor generator 130 in addition to the electric power from external power supply 500.

Then, vehicle ECU 300 determines in S210 whether or not an unfilled amount of the charging capacity of the power storage device can be compensated by charging using only charging cable 400.

When an insufficient amount of the charging capacity of the power storage device cannot be compensated by the charging using only charging cable 400 (NO in S210), the process is returned to S210, in which vehicle ECU 300 continues additional use of engine 160 for power generation until an insufficient amount of the charging capacity of the power storage device can be compensated by the charging using only charging cable 400.

When an unfilled amount of the charging capacity of the power storage device can be compensated by the charging using only charging cable 400 (YES in S210), vehicle ECU 300 stops power generation using engine 160 in S220. Then, in S230, vehicle ECU 300 uses the electric power from external power supply 500 to perform the charging operation until power storage device 110 is fully charged.

In addition, this step S210 is also applied to the case where engine 160 is stopped in the middle of external charging, as described with reference to FIG. 5. As shown in FIG. 3, when engine 160 is stopped upon termination of the charging operation using the electric power from external power supply 500, steps S210 and S220 in FIG. 7 are skipped. Then, in accordance with the fact that power storage device 110 is fully charged in S230, vehicle ECU 300 stops engine 160 upon termination of the charging operation using the electric power from external power supply 500 in S240.

Then, referring to FIG. 8, the details of the process in steps S120 and S130 in FIG. 7 will be hereinafter described.

Figure 8:
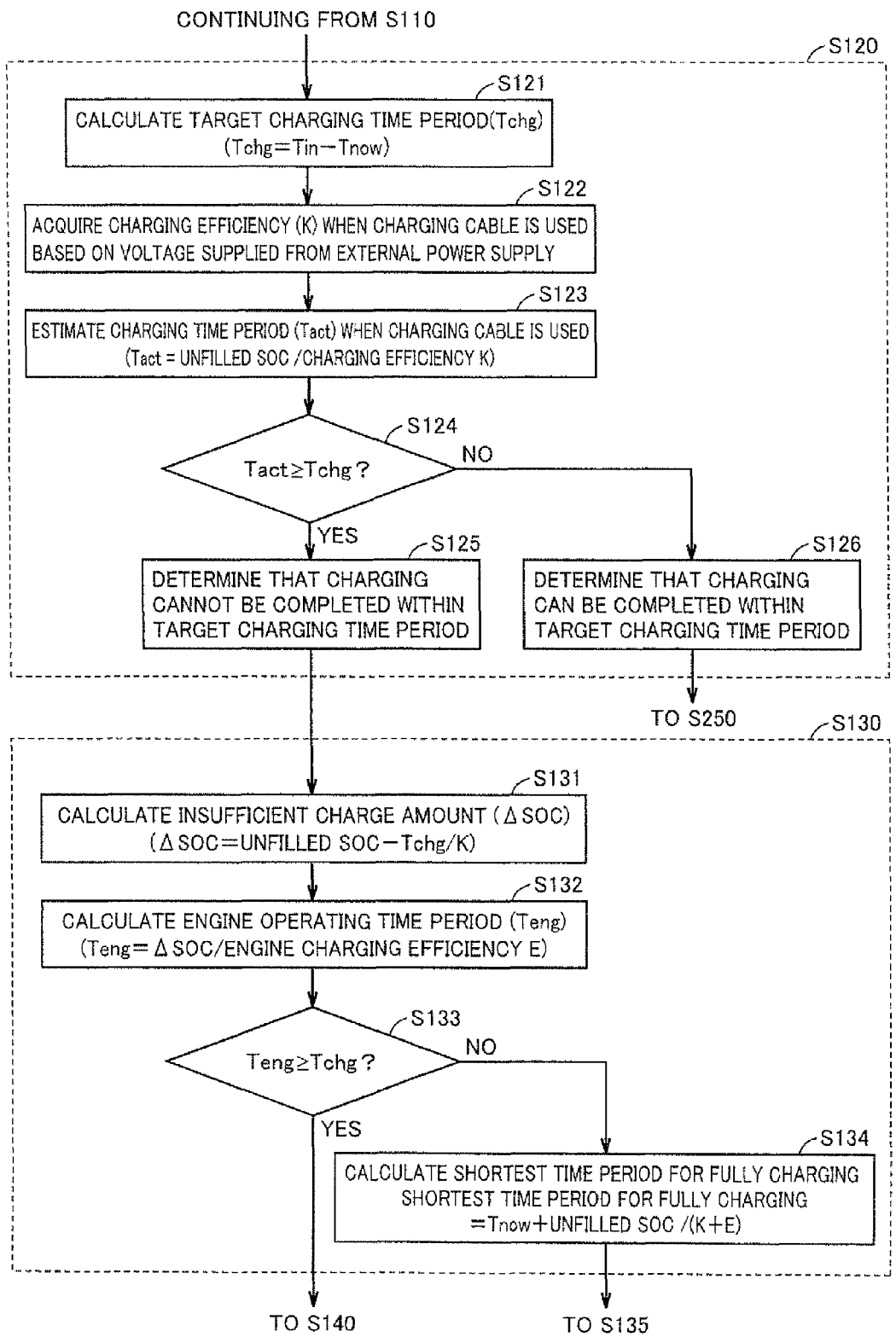
FIG. 8 is a flowchart for illustrating details of steps S120 and S130 in the flowchart in FIG. 7.

Referring to FIGS. 1 and 8, when charging completion target time Tin from the user is acquired in S110, vehicle ECU 300 subtracts a current time Tnow from the acquired charging completion target time Tin to calculate a target charging time period Tchg in S121.

Then, in S122, based on voltage VEX supplied from external power supply 500, vehicle ECU 300 uses a predetermined map and the like to acquire a charging efficiency K of the charging operation using charging cable 400. In S123, vehicle ECU 300 employs the SOC remaining amount of power storage device 110 and charging efficiency K to estimate a charging time period Tact in the case where the charging operation is performed using only charging cable 400.

Then, in S124, vehicle ECU 300 determines whether or not charging time period Tact in the case of the charging operation using only charging cable 400 is equal to or greater than target charging time period Tchg.

When charging time period Tact is smaller than target charging time period Tchg (NO in S124), vehicle ECU 300 determines that power storage device 110 can be charged within the target time period by the charging operation using only charging cable 400 (S126). Then, the process proceeds to S250 in which the subsequent process illustrated in FIG. 7 is performed.

When charging time period Tact is equal to or greater than target charging time period Tchg (YES in S124), it is determined that power storage device 110 cannot be charged within the charging time period by the charging operation using only charging cable 400 (S125). Then, the process proceeds to S131.

In S131, vehicle ECU 300 calculates an unfilled charge amount ΔSOC representing a charge amount that is insufficiently provided by the charging operation using only charging cable 400 within the target time period. Then, in S132, vehicle ECU 300 calculates an engine operating time period Teng required for power generation using engine 160 based on unfilled charge amount ΔSOC and a predetermined engine charging efficiency E. In this case, engine charging efficiency E may change in accordance with the rotation speed of engine 160 at the time when power generation is performed. As for engine charging efficiency E, it is suitable to employ the charging efficiency at the fixed rotation speed in the case where the rotation speed during power generation is set at a fixed value, and to employ the maximum charging efficiency within the range of the allowable rotation speed when the rotation speed is variable.

Then, in S133, vehicle ECU 300 determines whether engine operating time period Teng is equal to or greater than target charging time period Tchg.

When engine operating time period Teng is equal to or greater than target charging time period Tchg (YES in S133), the process proceeds to S140. Then, the subsequent process described in FIG. 7 is performed.

When engine operating time period Teng is smaller than target charging time period Tchg (NO in S133), the process proceeds to S134, in which vehicle ECU 300 calculates the shortest time period until power storage device 110 is fully charged in the case where the electric power from external power supply 500 and the electric power generated using engine 160 are concurrently used. Then, the process proceeds to S135, and then, the subsequent process described in FIG. 7 is performed.

By performing control in accordance with the processes shown in FIGS. 7 and 8 as described above, even if the target charging time period set by the user is relatively short, the power storage device can be charged in a short period of time by using the electric power from the external power supply and the electric power generated using the engine. Also in this case, the user can select whether or not to additionally use the electric power generated using the engine. Therefore, charging can also be performed using only the electric power from the external power when it is desirable to avoid fuel consumption. Furthermore, when the engine is additionally used for power generation, the temperature of the catalyst is raised by the EHC before starting the engine, thereby allowing efficient processing of the exhaust gas from the engine.

Second Embodiment

An explanation has been given in the first embodiment with regard to the configuration including an engine and a motor generator as a power generation device mounted in a vehicle. In the second embodiment, the configuration including a fuel cell as a power generation device will be described.

Figure 9:
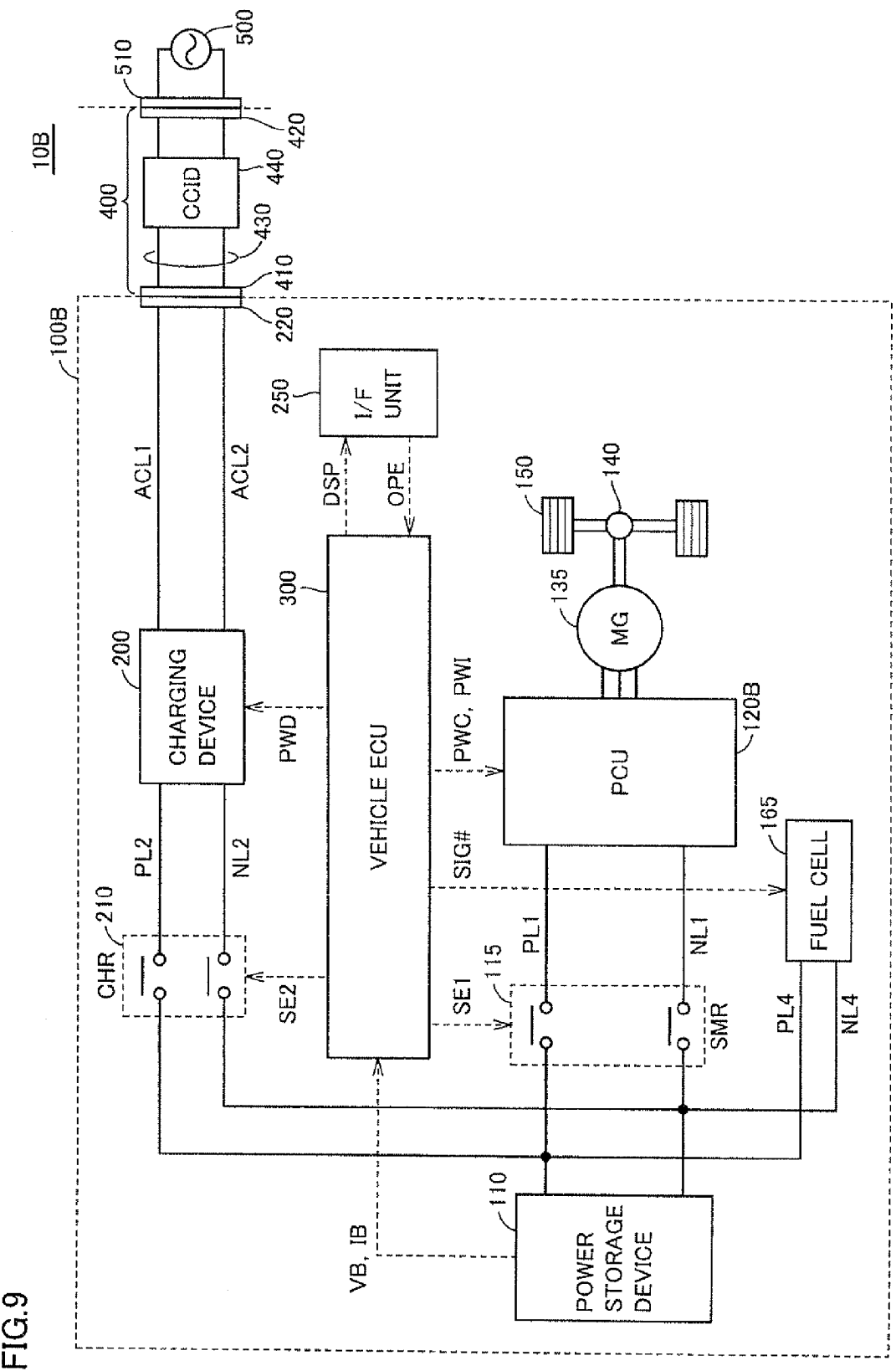
FIG. 9 is an entire block diagram showing a charging system including a vehicle according to the second embodiment.

FIG. 9 is an entire block diagram showing a charging system 10B including a vehicle 100B according to the second embodiment. In FIG. 9, in the configuration of vehicle 100 shown in FIG. 1 of the first embodiment, a fuel cell 165 is provided in place of engine 160 and motor generator 130. Accordingly, exhaust devices of engine 160 are deleted in FIG. 9. Furthermore, a PCU 120B is provided in place of PCU 120. The same elements as those in FIG. 1 will not be explained in FIG. 9.

Referring to FIG. 9, fuel cell 165 is connected to power storage device 110 through a power line PL4 and a ground line NL4. Fuel cell 165 is controlled by a control signal SIG# from vehicle ECU 300 to generate electric power. Then, power storage device 110 is charged by the generated electric power.

Although the details of PCU 120E are not shown, a converter, an inverter, a capacitor and the like are included as in PCU 120 in FIG. 1. It is to be noted that the number of inverters to be provided is one, which corresponds to motor generator 135.

By providing such a configuration, in the second embodiment, when the target charging time period set by the user is shorter than the time period during which power storage device 110 can be fully charged only by the electric power generated by using external power supply 500, power storage device 110 is charged additionally using the electric power generated using fuel cell 165.

Generally, since a fuel cell burns hydrogen to generate electric power, an exhaust system catalyst as in the engine is not required. Accordingly, the charging control process illustrated in FIGS. 6 to 8 of the first embodiment can also be applied to the second embodiment, except for the components related to the EHC, by replacing the configuration generating electric power using the engine with the configuration generating electric power using a fuel cell.

In this way, also in the vehicle provided with a fuel cell as a power generation device, even when the target charging time period set by the user is relatively short, the power storage device can be charged in a relatively short time period using the electric power from the external power supply and the electric power generated by the fuel cell.

In addition, an "I/F unit 250" in the present embodiment is an example of a "notification unit" in the present invention. Also an "EHC 180" in the present embodiment is an example of a "warm-up device" in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10, 10A, 10B charging system, 100, 100A, 100B vehicle, 110 power storage device, 115 SMR, 120 PCU, 130, 135 motor generator, 140 power transmission gear, 150 driving wheel, 160 engine, 165 fuel cell, 170 EHC drive unit, 180 EHC, 190 exhaust pipe, 200 charging device, 210 CHR, 220, 552 connection unit, 250, 554 I/F unit, 260, 555 communication unit, 300 vehicle ECU, 310 SOC calculation unit, 320 setting input unit, 330 charging time period calculation unit, 340 charge control unit, 350 display control unit, 360 engine control unit, 370 EHC control unit, 400 charging cable, 410 charging connector, 420 plug, 430 power line unit, 440 CCID, 500 external power supply, 510 receptacle, 550 power feeding device, 551 relay, 553 power feeding ECU, ACL1, ACL2, PL1 to PL4 power line, C1, C2 capacitor, NL1 to NL4 ground line.

The invention claimed is:

1. A vehicle allowing a power storage device mounted therein to be externally charged using electric power from an external power supply, said vehicle comprising:
    a power generation device; and
    a control device for controlling said external charging, during said external charging,
    when it is estimated that charging of said power storage device cannot be completed within a target charging time period set by a user using only the electric power from said external power supply, said control device charging said power storage device with the electric power from said external power supply additionally using electric power generated by said power generation device.

2. The vehicle according to claim 1, wherein, when it is estimated that charging is not completed within the set target charging time period only by the electric power from said external power supply, said control device uses said power generation device to generate electric power to provide charging electric power insufficiently provided by said external power supply, so as to fully supply required charging electric power.

3. The vehicle according to claim 2, wherein, when it is estimated that charging is not completed within the set target charging time period only by the electric power from said external power supply, said control device makes a selection, based on setting by the user, between charging additionally using said generated electric power and extension of a charging time period.

4. The vehicle according to claim 2, wherein
    said power generation device can be set such that the generated electric power is variable, and
    said control device controls said power generation device such that the unfilled electric power is generated within the set target charging time period.

5. The vehicle according to claim 2, wherein said control device stops power generation by said power generation device in a case where unfilled charging electric power of the required charging electric power can be supplied within the set target charging time period using only the electric power from said external power supply when charging is performed additionally using said generated electric power.

6. The vehicle according to claim 1, wherein
    said power generation device includes
    an internal combustion engine, and
    a rotating electric machine generating electric power using driving force from said internal combustion engine.

7. The vehicle according to claim 6, further comprising a warm-up device for raising a temperature of a catalyst for purifying exhaust gas of said internal combustion engine, wherein
    when charging is performed additionally using said generated electric power, said control device raises the temperature of said catalyst by driving said warm-up device before driving said internal combustion engine.

8. The vehicle according to claim 7, wherein said control device drives said internal combustion engine when the temperature of said catalyst exceeds a predetermined reference temperature.

9. The vehicle according to claim 7, wherein said control device stops said warm-up device when the temperature of said catalyst exceeds a predetermined reference temperature.

10. The vehicle according to claim 1, wherein said power generation device includes a fuel cell.

11. The vehicle according to claim 1, further comprising a notification unit for notifying the user of information about charging.

12. The vehicle according to claim 11, wherein, when it is estimated that charging is not completed within the set target charging time period only by the electric power from said external power supply, said control device causes said notification unit to notify the user to make a selection between charging additionally using said generated electric power and extension of a charging time period.

13. The vehicle according to claim 11, wherein, when it is estimated that charging is not completed within the set target charging time period even when charging is performed additionally using said generated electric power, said control device causes said notification unit to notify the user of at least one of the estimation that charging is not completed within said target charging time period and an estimated charging time period required until completion of charging.

14. A method of controlling a vehicle, said method allowing charging of a power storage device mounted in the vehicle using electric power from an external power supply and electric power generated by a power generation device mounted in the vehicle, said method comprising:
   the step of causing a user to set a target charging time period;
   the step of determining whether charging of said power storage device can be completed or not within said target charging time period using only the electric power from said external power supply; and,
   the step of, when charging of said power storage device cannot be completed within said target charging time period using only the electric power from said external power supply, charging said power storage device with the electric power from said external power supply additionally using said generated electric power.

15. The method of controlling a vehicle according to claim 14, wherein
   said power generation device includes
   an internal combustion engine, and
   a rotating electric machine generating electric power using driving force from said internal combustion engine,
   said vehicle includes a warm-up device for raising a temperature of a catalyst for purifying exhaust gas of said internal combustion engine, and
   said method further comprises the step of raising the temperature of said catalyst by driving said warm-up device before driving said internal combustion engine when charging is performed additionally using said generated electric power.

16. The method of controlling a vehicle according to claim 14, wherein
   said vehicle further includes a notification unit for notifying the user of information about charging,
   said method further comprises the step of causing said notification unit to notify the user to make a selection between charging additionally using said generated electric power and extension of a charging time period, when it is estimated that charging is not completed within the set target charging time period only by the electric power from said external power supply.

17. The method of controlling a vehicle according to claim 16, further comprising the step of causing said notification unit to notify the user of at least one of the estimation that charging is not completed within said target charging time period and an estimated charging time period required until completion of charging, when it is estimated that charging is not completed within the set target charging time period even if charging is performed additionally using said generated electric power.

* * * * *